(12) United States Patent
Huang et al.

(10) Patent No.: US 11,192,326 B2
(45) Date of Patent: Dec. 7, 2021

(54) FLEXIBLE FILM ARTICLE

(71) Applicants: Chen-Cheng Huang, Taipei (TW); Pao-Hao Huang, Taipei (TW); Pao-Han Huang, Taipei (TW)

(72) Inventors: Chen-Cheng Huang, Taipei (TW); Pao-Hao Huang, Taipei (TW); Pao-Han Huang, Taipei (TW)

( * ) Notice: Subject to any disclaimer, the term of this patent is extended or adjusted under 35 U.S.C. 154(b) by 342 days.

(21) Appl. No.: 16/400,344

(22) Filed: May 1, 2019

(65) Prior Publication Data
US 2019/0337260 A1   Nov. 7, 2019

(30) Foreign Application Priority Data
May 4, 2018   (TW) .................. 107115308

(51) Int. Cl.
B32B 5/02    (2006.01)
C08J 5/22    (2006.01)
B32B 38/00   (2006.01)
B32B 3/30    (2006.01)
B32B 3/26    (2006.01)

(52) U.S. Cl.
CPC ............... B32B 5/022 (2013.01); B32B 3/26 (2013.01); B32B 3/266 (2013.01); B32B 3/30 (2013.01); C08J 5/22 (2013.01); *B32B 2038/0028* (2013.01)

(58) Field of Classification Search
CPC ... B32B 5/002; B32B 2038/0028; B32B 3/30; B32B 3/266; B32B 3/26; C08J 5/22; A41D 27/28
See application file for complete search history.

(56) References Cited

U.S. PATENT DOCUMENTS

| | | | | |
|---|---|---|---|---|
| 2,697,832 | A * | 12/1954 | Stich ...................... | A41D 31/00 2/87 |
| 3,801,987 | A * | 4/1974 | Thompson, Jr. ....... | A41D 27/10 2/125 |
| 2007/0161305 | A1* | 7/2007 | Wangbunyen ........ | D06M 15/00 442/59 |
| 2016/0339594 | A1* | 11/2016 | Aihara .................. | A41D 31/00 |
| 2017/0231306 | A1* | 8/2017 | Nordstrom ............. | B32B 5/022 428/175 |

* cited by examiner

*Primary Examiner* — Michael Zhang
(74) *Attorney, Agent, or Firm* — Hamre, Schumann, Mueller & Larson, P.C.

(57) ABSTRACT

A flexible film article includes: a film body having opposite first and second surfaces, and at least one surrounding surface extending from the first surface to the second surface and defining a through hole extending through the film body; at least one central member spaced apart from the surrounding surface; and a plurality of spaced-apart extending members, each of which having two opposite ends connected to the surrounding surface and the central member, respectively. The spaced-apart extending members, the central member, and the surrounding surface cooperatively define spaced-apart micropores for passing of a gaseous substance therethrough.

9 Claims, 8 Drawing Sheets

FLEXIBLE FILM ARTICLE

CROSS-REFERENCE TO RELATED APPLICATION

This application claims priority of Taiwanese Invention Patent Application No. 107115308, filed on May 4, 2018.

FIELD

This disclosure relates to a flexible film article, and more particularly to a flexible film article formed with at least one central member and a plurality of spaced-apart extending members.

BACKGROUND

A conventional flexible film article (e.g., clothes and fabrics) is generally formed with micropores extending through the flexible film article to enhance breathable property thereof. However, gaseous substances, such as moisture-rich air, can only permeate through the micropores in a direction in which the micropores extend, and breathability and dissipation properties of the film article cannot be adjusted according to whether there is permeation of the gaseous substances therethrough.

SUMMARY

Therefore, an object of the disclosure is to provide a flexible film article so as to alleviate or eliminate the aforementioned shortcoming of the conventional flexible film article.

According to the disclosure, a flexible film article includes: a film body having a first surface, a second surface opposite to the first surface, and at least one surrounding surface extending from the first surface to the second surface and defining a through hole extending through the film body; at least one central member spaced apart from the surrounding surface; and a plurality of spaced-apart extending members, each of which having a first end connected to the surrounding surface and a second end opposite to the first end and connected to the central member. The central member, the spaced-apart extending members and the surrounding surface of the film body cooperatively define a plurality of spaced-apart micropores. The central member drives the extending members together therewith to move away from the film body when a gaseous substance permeates through the micropores. The central member and the extending members are coplanar when no gaseous substance permeates through the micropores.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
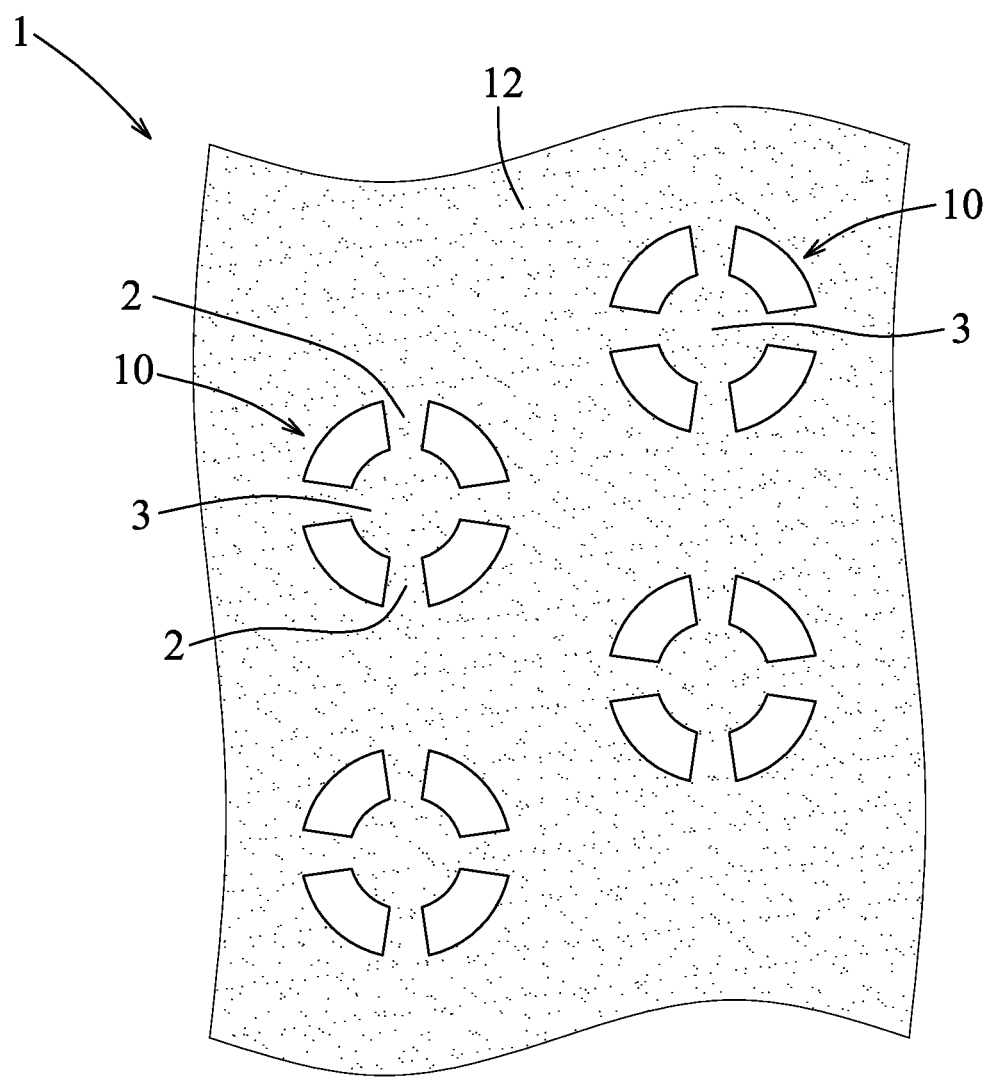
FIG. 1 is a fragmentarily top view of an embodiment of a flexible film article according to the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Figure 2:
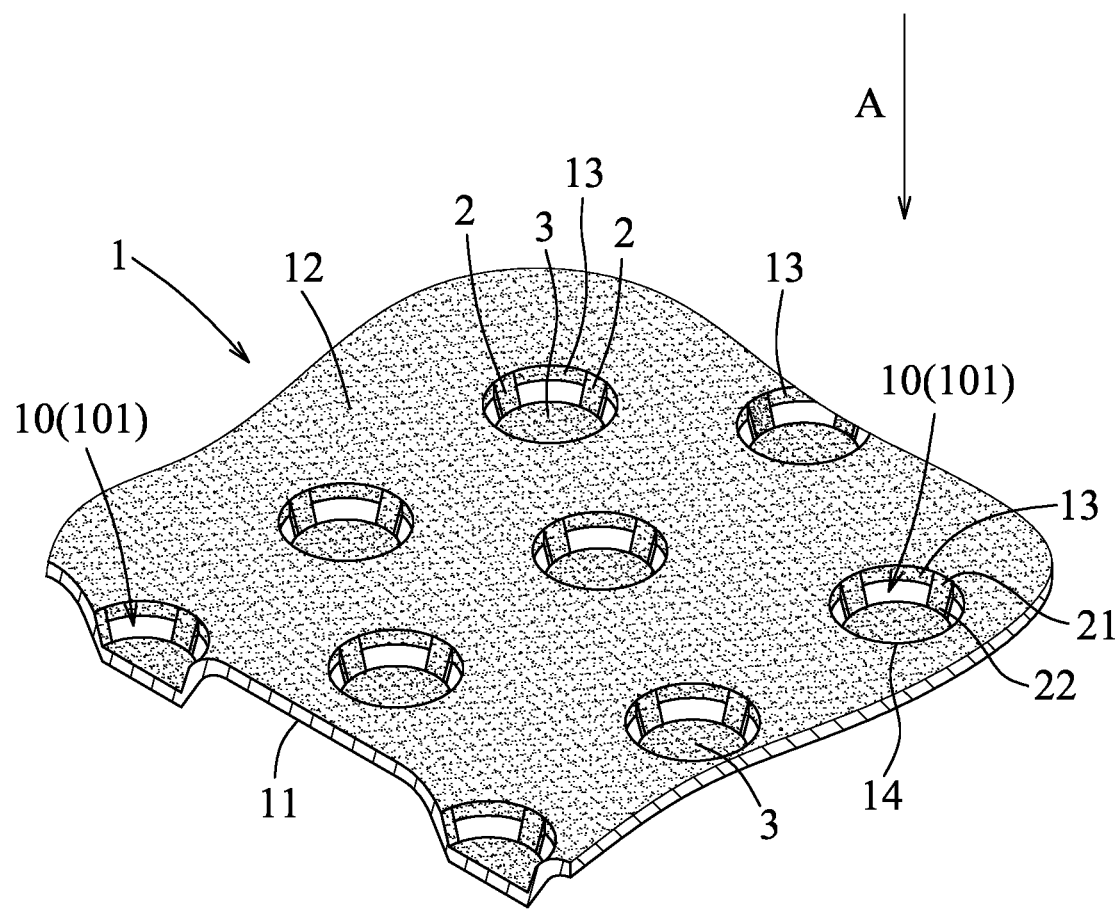
FIG. 2 is a fragmentarily perspective view illustrating a structure of the flexible film article of FIG. 1 when a gaseous substance permeates through the micropores thereof.

Referring to FIGS. 1 and 2, an embodiment of a flexible film article of the disclosure includes a film body 1, at least one central member 3 and a plurality of spaced-apart extending members 2. The film body 1 has a first surface 11, a second surface 12 opposite to the first surface 11, and at least one surrounding surface 13 extending from the first surface 11 to the second surface 12 and defining a through hole 14 extending through the film body 1. In this embodiment, the flexible film article includes a plurality of the central members 3 and the film body 1 has a plurality of the surrounding surfaces 13. Each of the central members 3 is spaced apart from a corresponding one of the surrounding surfaces 13. Each of the spaced-apart extending members 2 has a first end 21 connected to a corresponding one of the surrounding surfaces 13 and a second end 22 opposite to the first end 21 and connected to a corresponding one of the central members 3. Each of the central members 3, the corresponding spaced-apart extending members 2, and the corresponding surrounding surface 13 connected together cooperatively define a plurality of spaced-apart micropores 10. For each of the central members 3, the corresponding extending members 2 may radially extend therefrom to the corresponding surrounding surface 13. In one form, each of the central members 3 may be, but is not limited to, circular or other shapes modified based on requirements, for example, a polygon. In one form, each of the central members 3 is connected to four of the spaced-apart extending members 2.

The flexible film article of the embodiment of disclosure can be prepared by forming, on a raw material film, the film body 1 with a plurality of the through holes 14 and a plurality of the micropores 10, a plurality of the extending members 2, and a plurality of the central members 3 using laser cutting, molding, hydraulic needling or other suitable techniques. The raw material film may be made from one of woven fabric, non-woven fabric, plastic, and any composites thereof.

Each of the micropores 10 may have a pore size range between 20 μm and 20,000 μm. In one form, depending upon a user's needs and actual usages, the micropores 10 may have a predetermined pore size within the above range or a pore size distribution varying in the above range.

Figure 3:
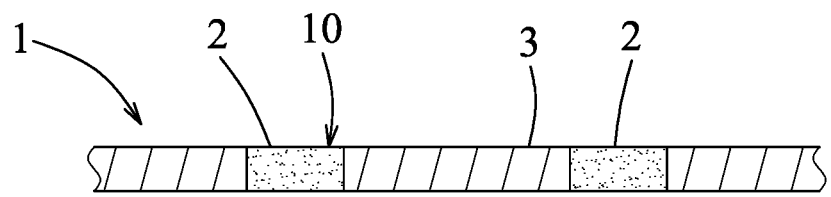
FIG. 3 is a fragmentarily sectional view illustrating the structure of the flexible film article of FIG. 1 when no gaseous substance permeates through the micropores.

As shown in FIG. 3, each of the central members (only one shown) and the corresponding extending members 2 are coplanar when no gaseous substance permeates through.

Figure 4:
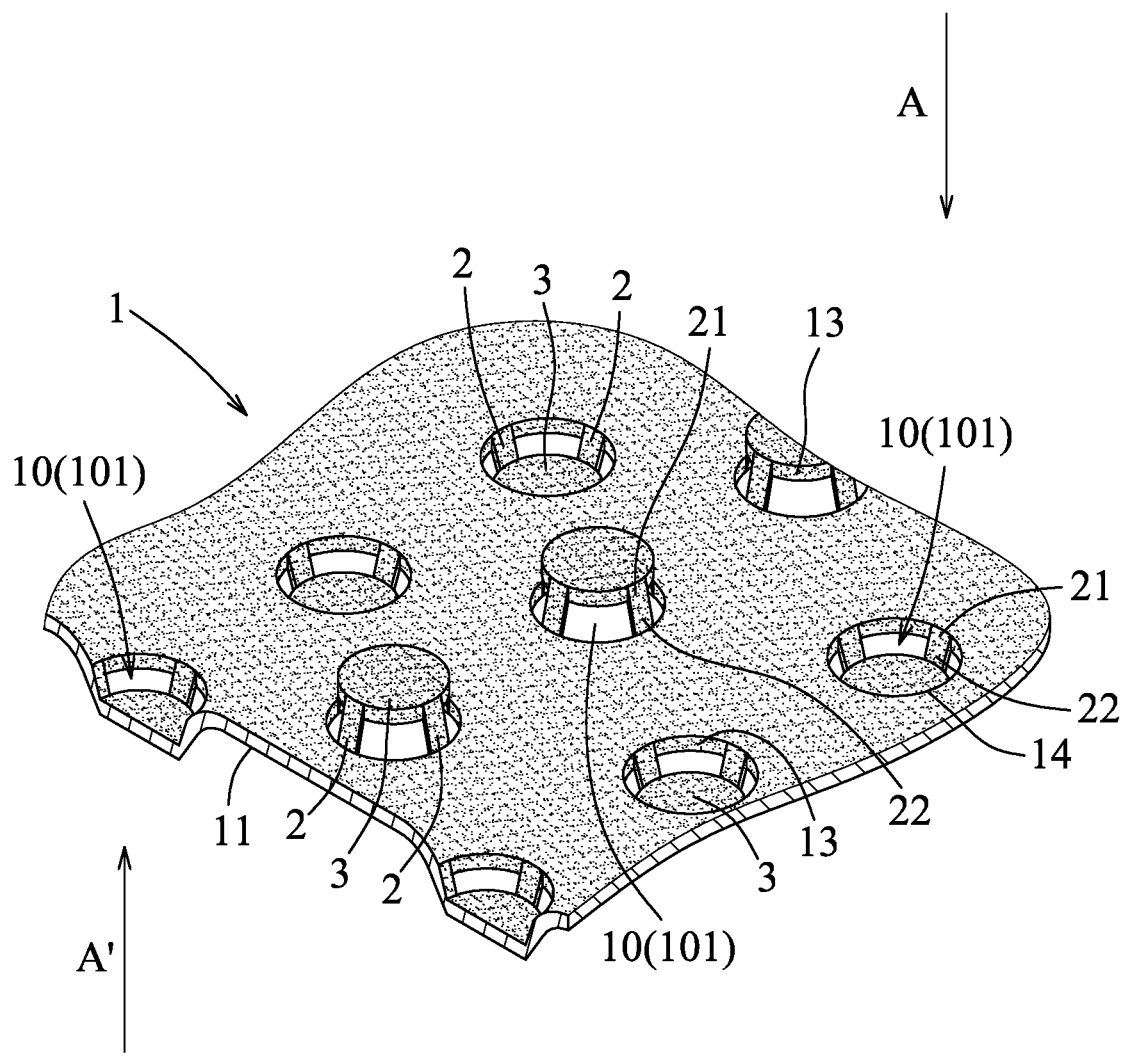
FIG. 4 is a fragmentarily perspective view illustrating the structure of the flexible film article of FIG. 1 when the gaseous substance permeates through the micropores in different directions.
Figure 5:
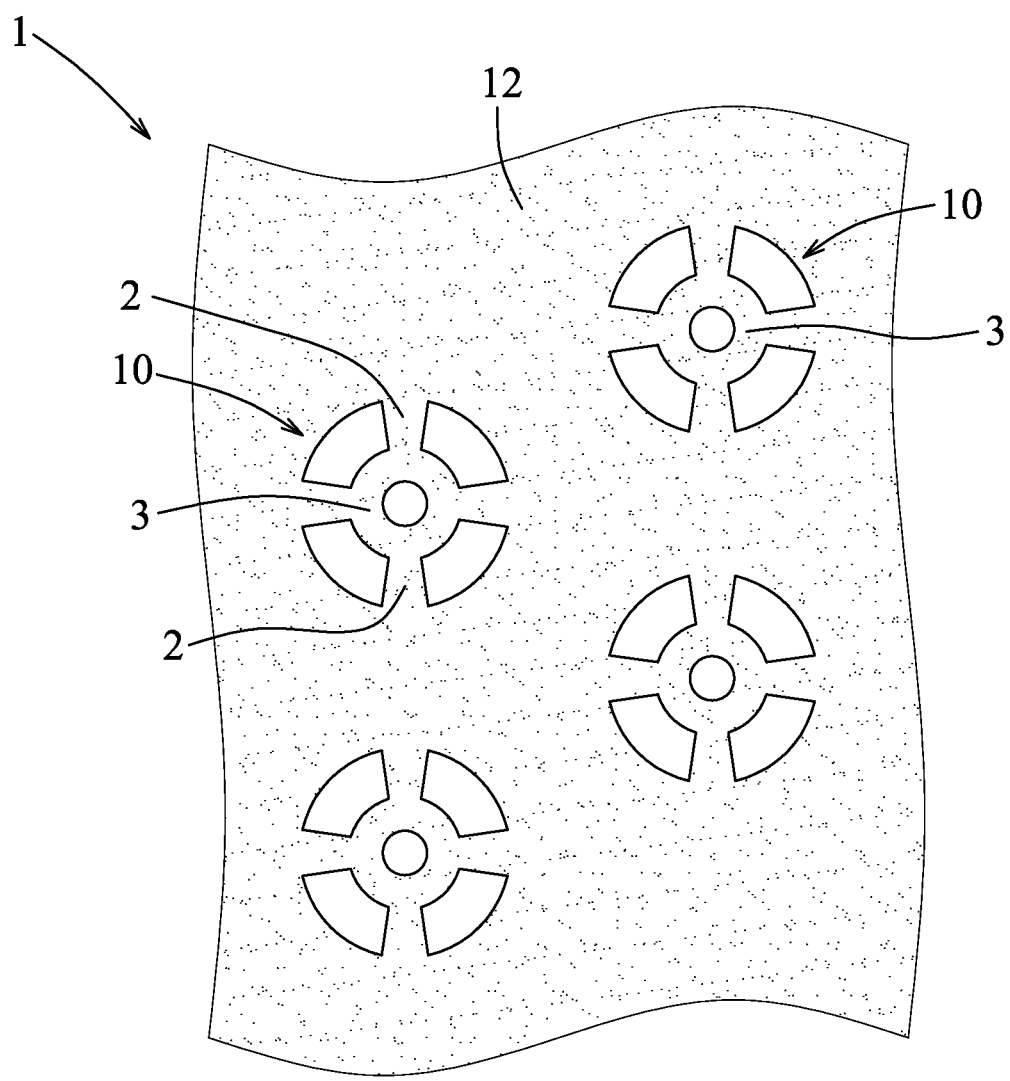
FIG. 5 is a fragmentarily top view illustrating another configuration of the embodiment.

Referring to FIGS. 2 and 4, when a gaseous substance, such as moisture-rich air, permeates through the micropores 10 downwards as indicated by an arrow (A), each of the central members 3 drives the corresponding extending members 2 connected thereto together therewith to move away from the film body 1 and downwards, and slightly bends a portion of the corresponding surrounding surface 13 of the film body 1 and portions of the extending members 2 adjacent to the corresponding micropores 10. During this process, each of the central members 3 and the corresponding extending members 2 connected thereto protrude from the film body 1 downwards and cooperatively define a funnel-shaped space 101 indented from the second surface 12 towards the first surface 11.

On the other hand, when the gaseous substance permeates through the micropores 10 in different directions, such as the downward direction as indicated by the arrow (A) and an upward direction as indicated by an arrow (A'), each of the central members 3 will move away from the film body 1 following the direction in which the gaseous substance is flowing at a position thereof, thereby causing the funnel-shaped spaces 101 to form towards the different directions at different positions, i.e., indented from the first surface 11 towards the second surface 12 where the gaseous substance permeates through the micropores 10 upwards, and indented from the second surface 12 towards the first surface 11 where the gaseous substance permeates through the micropores 10 downwards (FIG. 4).

Referring to FIGS. 5 to 8, another configuration of the flexible film article of disclosure is illustrated. In this configuration, the central member 3 is ring-shaped for facilitating permeation of the gaseous substance through the film body 1.

Figure 7:
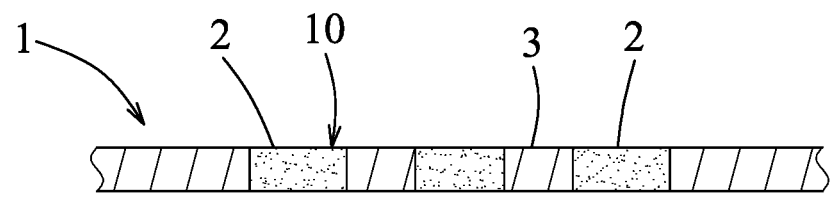
FIG. 7 is a fragmentarily sectional view illustrating the structure of the flexible film article of FIG. 5 when no gaseous substance permeates through the micropores.

As shown in FIG. 7, the extending members 2 and the central members 3 (only one shown) are coplanar when no gaseous substance permeates through the micropores 10.

Figure 6:
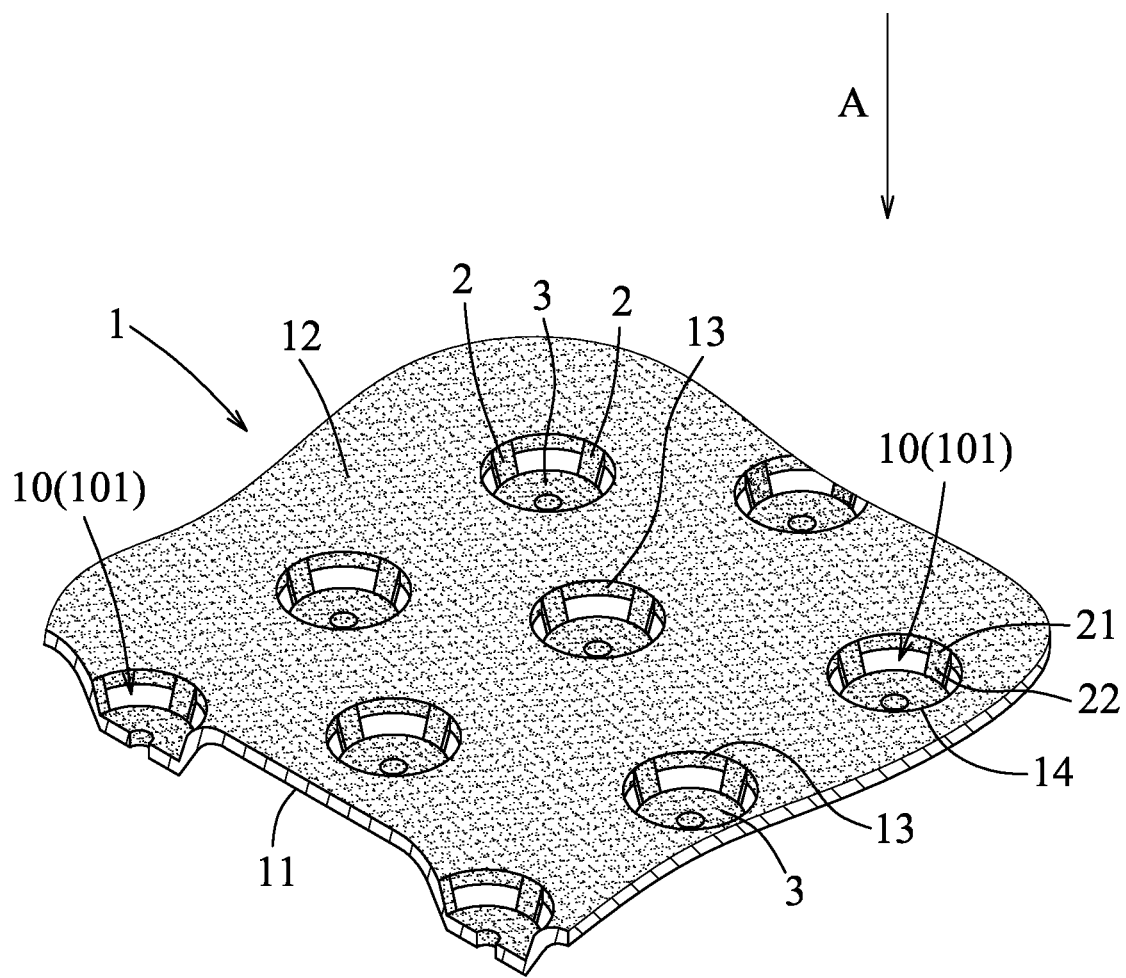
FIG. 6 is a fragmentarily perspective view illustrating the structure of the flexible film article of FIG. 5 when the gaseous substance permeates through the micropores.
Figure 8:
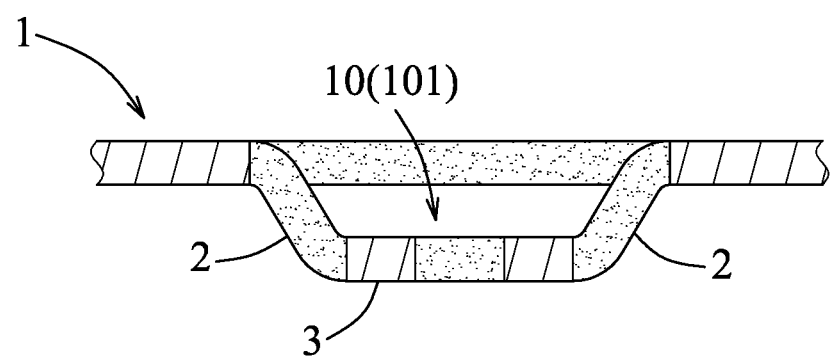
FIG. 8 is a fragmentarily sectional view illustrating the structure of the flexible film of FIG. 5 when the gaseous substance permeates through the micropores.

When a gaseous substance permeates through the micropores 10 of the flexible film article downwards as shown in FIGS. 6 and 8, each of the central members 3 drives the corresponding extending members 2 connected thereto to move away from the film body 1 in the direction indicated by the arrow (A), and slightly bends the portions of the corresponding surrounding surfaces 13 of the film body 1 and the portions of the extending members 2 adjacent to the corresponding micropores 10. During this process, similar to the flexible film article shown in FIG. 2, each of the central members 3 and the corresponding extending members 2 connected thereto protrude from the film body 1 and cooperatively define a funnel-shaped space 101 indented from the second surface 12 towards the first surface 11. Similarly, when the gaseous substance permeates through the micropores 10 in different directions, the funnel-shaped spaces 101 may each be indented from one of the first surface 11 and the second surface 12 towards the other of the first surface 11 and the second surface 12.

Figure 9:
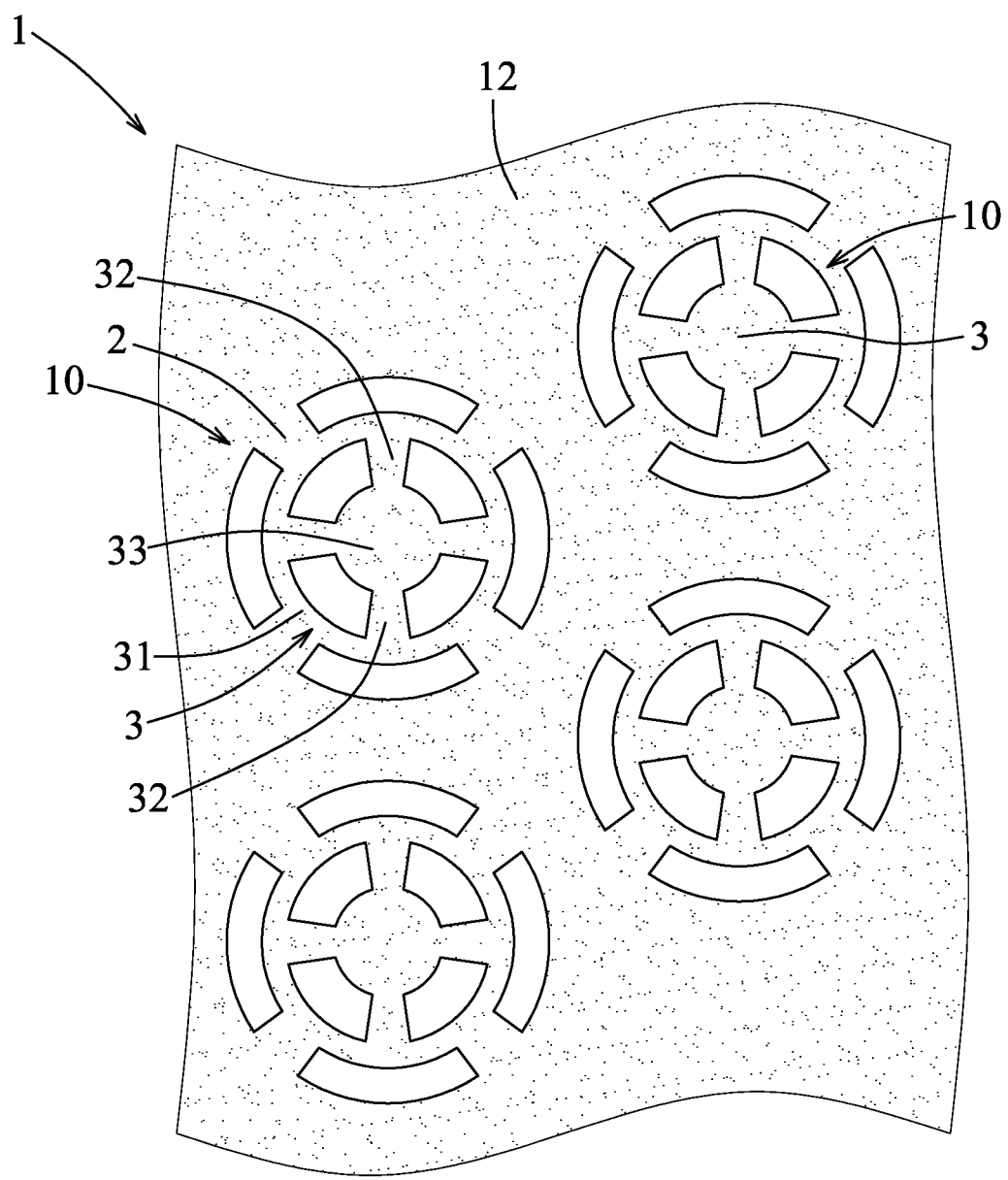
FIG. 9 is a fragmentarily top view of still another configuration of the flexible film article of the embodiment according to the disclosure.

Referring to FIG. 9, another configuration of the flexible film article of disclosure is illustrated. In this configuration, each of the central members 3 includes an outer annular portion 31 having an inner annular surface 311 opposite of the extending members 2, an inner central portion 33 spaced apart from the inner annular surface 311 of the outer annular portion 31, and a plurality of spaced-apart extending portions 32. Each of the extending portions 32 has a first end 321 connected to the inner annular surface 311 of the outer annular portion 31 and a second end 322 opposite to the first end 321 and connected to the inner central portion 33. In addition, the extending portions 32 of each of the central members 3 radially extend from the inner central portion 33 to the inner annular surface 311 of the outer annular portion 31.

Similar to the flexible film articles shown in FIGS. 1 to 8, when no gaseous substance permeates through the micropores 10 of the flexible film article, the extending members 2 and the central members 3 are coplanar, and the extending portions 32 and the inner central portion 33 are also coplanar.

Figure 10:
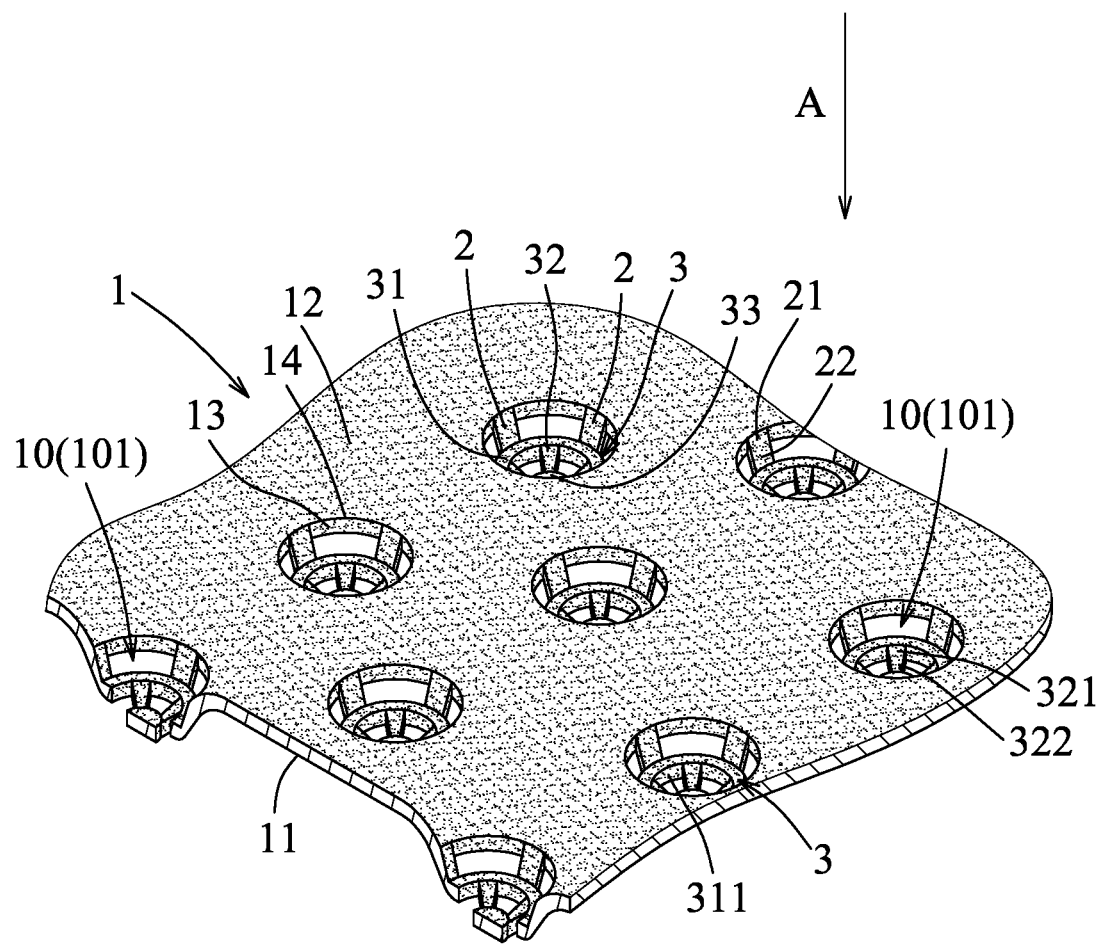
FIG. 10 is a fragmentarily perspective view illustrating the flexible film of FIG. 9 when the gaseous substance permeates through the micropores.

Referring to FIG. 10, when the gaseous substance permeates through the micropores 10 such as in the direction as indicated by the arrow (A), each of the central members 3 drives the corresponding extending members 2 attached thereto together therewith to move away from the film body 1 in the direction indicated by the arrow (A), and slightly bends the portions of the surrounding surfaces 13 of the film body 1 and the portions of the extending members 2 adjacent to the corresponding micropores 10. At the same time, the inner central portion 33 of each of the central members 3 drives the extending portions 32 together therewith to move away from the outer annular portion 31. During this process, the central members 3 in their entireties and the extending members 2 connected thereto protrude from the film body 1 and cooperatively define the funnel-shaped space 101 indented from the second surface 12 towards the first surface 11. Similar to the structure illustrated in FIG. 4, when the gaseous substances permeate through the micropores 10 in different directions, the funnel-shaped spaces 101 may have different positions relative to the film body 1.

In sum, by virtue of a structural arrangement of the film body 1, the central members 3 and the extending members 2, the central members 3 and the extending members 2 are coplanar when no gaseous substance permeates through the micropores 10 of the film body 1, and are movable relative to the film body 1 when there is the gaseous substance permeating through the micropores 10 of the flexible film article. When the central members 3 and the extending members 2 move relative to the film body 1, formation of the funnel-shaped protruding spaces 101 is beneficial for dissipation and breathability properties of the flexible film article of disclosure.

In the description above, for the purposes of explanation, numerous specific details have been set forth in order to provide a thorough understanding of the embodiment and variations. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is considered the exemplary embodiment and variations, it is understood that this disclosure is not limited to the disclosed embodiment but is intended to cover various arrangements included within the spirit and scope of the broadest interpretation so as to encompass all such modifications and equivalent arrangements.

What is claimed is:

1. A flexible film article comprising:
   a film body having a first surface, a second surface opposite to said first surface, and at least one surrounding surface extending from said first surface to said second surface and defining a through hole extending through said film body;
   at least one central member spaced apart from said surrounding surface; and
   a plurality of spaced-apart extending members, each of which having a first end connected to said surrounding surface and a second end opposite to said first end and connected to said at least one central member, said at least one central member, said spaced-apart extending members and said surrounding surface of said film body cooperatively defining a plurality of spaced-apart micropores,
   wherein said at least one central member drives said extending members together therewith to move away from said film body when a gaseous substance permeates through said micropores; and
   wherein said at least one central member and said extending members are coplanar when no gaseous substance permeates through said micropores.

2. The flexible film article according to claim 1, which is made from a material selected from one of woven fabric, non-woven fabric, and plastic.

3. The flexible film article according to claim 1, wherein each of said micropores has a pore size ranging from 20 μm to 20,000 μm.

4. The flexible film article according to claim 1, wherein when said at least one central member drives said extending members together therewith to move away from said film body, said extending members and said at least one central member cooperatively define a funnel-shaped space indented from one of said first surface and said second surface towards the other of said first surface and said second surface.

5. The flexible film article according to claim 1, wherein said extending members radially extend from said at least one central member to said surrounding surface of said film body.

6. The flexible film article according to claim 1, wherein said at least one central member is circular.

7. The flexible film article according to claim 1, wherein said at least one central member is ring-shaped.

8. The flexible film article according to claim 1, wherein said at least one central member includes:
   an outer annular portion having an inner annular surface opposite of said extending members;
   an inner central portion spaced apart from said inner annular surface of said outer annular portion; and
   a plurality of spaced-apart extending portions each of which having a first end connected to said inner annular surface of said outer annular portion and a second end opposite to said first end and connected to said inner central portion,
   wherein said inner central portion drives said extending portions together therewith to move away from said outer annular portion when the gaseous substance permeates through said micropores, and
   wherein said inner central portion and said extending portions are coplanar when no gaseous substance permeates through said micropores.

9. The flexible film article according to claim 8, wherein said extending portions radially extend from said inner central portion to said inner annular surface of said outer annular portion.

* * * * *